UNITED STATES PATENT OFFICE.

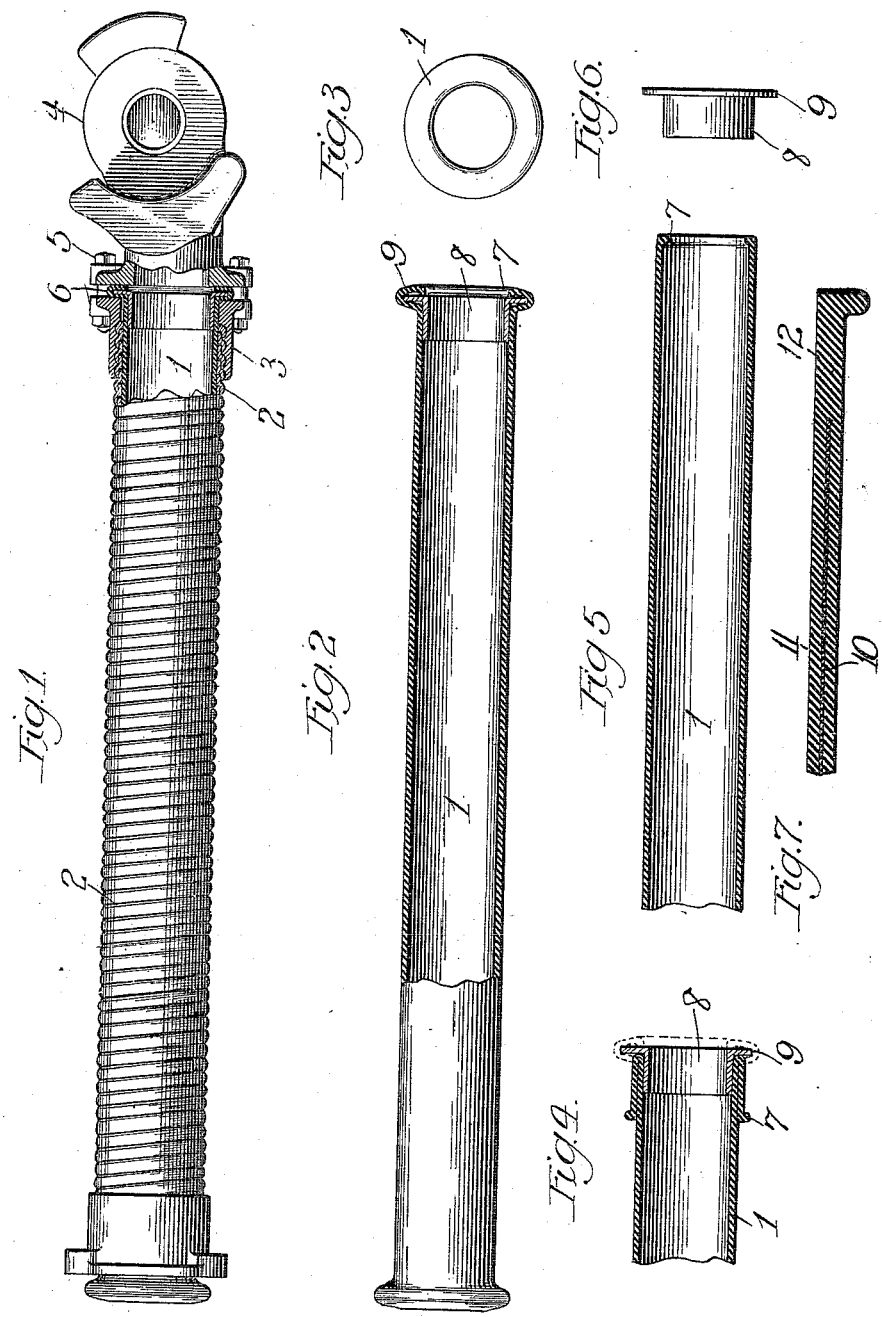

ALFRED P. MILLER, OF CHICAGO, ILLINOIS.

HOSE AND GASKET.

994,861. Specification of Letters Patent. Patented June 13, 1911.

Application filed February 25, 1903, Serial No. 144,953. Renewed April 24, 1911. Serial No. 623,070.

*To all whom it may concern:*

Be it known that I, ALFRED P. MILLER, residing at Chicago, Cook county, Illinois, have invented certain new and useful Improvements in Hose and Gaskets, of which the following is a specification.

My invention relates to flexible pipe and hose generally and the object thereof is to provide a simple, efficient and economical means for forming an integral flange or gasket from the body of the hose itself.

For the purpose of affording a clear and comprehensive understanding of my invention I have shown the same embodied in a complete commercial structure known as the hose and coupling for the pipes used on railroad cars for air pressure for the brake and signal systems and for the car-heating system. My invention, however, may have varied uses and embodiments and, in fact, I contemplate employing such invention wherever the same is applicable.

In the accompanying drawing, Figure 1 is an elevation, partly in section, of a hose and coupling embodying my invention and in the present instance showing an armored hose; Fig. 2 an elevation, partly in section, of the hose and of the ferrule or flanged sleeve employed; Fig. 3 an elevation of the end of such hose; Fig. 4 a section of a portion of the hose illustrating steps in the method of forming the flange or gasket; Fig. 5 a section of the hose prior to the forming of the gasket thereon; Fig. 6 an elevation of the ferrule or flanged sleeve, and Fig. 7 a section of a special form of hose.

In the present instance, I have for convenience in description, illustrated a hose 1, covered or protected by a metallic armor 2 on which is secured a coupling member 3. The coupling 4, of the usual and well known form, is bolted to the coupling member 3 by means of bolts 5 or otherwise, and between such parts is arranged or clamped an integral flange or gasket 6 formed from the body itself of the hose in the manner now to be explained. However, before proceeding further, I wish it understood that so far as my invention is concerned the hose need not be armored or be associated with the particular coupling shown, but that the structure just described forms one of the many practical embodiments and applications of my invention.

By preference, the hose, which is flexible, being of rubber or the like, is provided at its ends with a small inturned lip or bead 7 as best seen in Fig. 5, the purpose of which will be apparent from the description hereinafter given.

As the first step in the formation of the integral gasket, the end of the hose is doubled back upon itself a suitable distance depending upon the desired size of gasket or flange portion, whereupon the hose will appear as in Fig. 4. A ferrule or sleeve 8, having its cylindrical portion corresponding in diameter to the internal diameter of the hose and provided with an outwardly turned flange 9 is inserted in the end of the hose in the manner illustrated by Fig. 4. The next step consists in unfolding the end of the hose which had been folded back and carrying or drawing it over the margin and top face of the flange of the ferrule whereupon the parts will appear as indicated by the dotted lines in Fig. 4. A strong and reinforced gasket or flange integral with the body of the hose and covering both faces of the flange 9 thus results and at the same time the ferrule serves to strengthen the hose itself at the end. Moreover, by the use of the lip or bead 7 the diameter of the opening at the ends of the hose is reduced with the result that the lip or bead seeking to reach its normal diameter or position causes the end of the hose to conform substantially to the flange of the ferrule and to maintain that position. Furthermore, it is preferred that when a coupling is made, this lip or bead shall rest upon the flange near its base so that when the coupling members are drawn up tight the lip or bead will be considerably compressed (and in advance of the other parts of the integral gasket) and a tight joint thereby produced.

In the above description, it has been assumed that the hose used is a pure gum hose but in case it is desired to use a hose which is reinforced, as by canvas or the like, it is necessary that the reinforced portion shall not extend to the outer ends of the hose, which should be left pure gum or rubber, for otherwise it would be practically impossible to properly fold back the hose ends or draw them back over the ferrule in the manner hereinbefore explained. Such novel form of a reinforced hose is illustrated by Fig. 7, in which the canvas 10 or other reinforcing material extends to within a suitable or desired distance from the end of the hose, thereby forming an intermediate reinforced portion 11 and a portion 12 of the original flexible material or gum. A suitable length of the hose ends is thus left of pure gum, that is, non-reinforced, but it is desired that the reinforced portion of the hose should extend partially alongside of the ferrule and preferably as far as the base of the flange thereof. When the canvas thus extends as far as the flange, it acts as a gage to determine the amount of doubling back of the hose, inasmuch as the canvas tends to resist any such folding.

I claim:

1. The combination of a flexible hose 1, armor 2 therefor, coupling member 3 engaging the armor, a ferrule 8 having a flange over which the end of the hose is drawn to form a gasket, and a second coupling member arranged to be connected to the member 3 to clamp the gasket between them, said hose being reinforced intermediate of its length substantially as far as the ferrule but of the flexible material at its end adjacent such ferrule.

2. As a new article of manufacture, a flexible hose having an end bead, in combination with a flanged ferrule over whose flange the end of the hose is drawn, said bead being arranged to press upon the outer face of the flange of the ferrule.

3. As a new article of manufacture, a flexible hose having an inwardly extending bead, in combination with a cylindrical ferrule having a flange, said bead being arranged to hold the end of the hose in folded position upon said flange.

4. As a new article of manufacture, a flexible hose composed of elastic material and reinforced with canvas with the exception of an end thereof, in combination with a ferrule having a flange of larger diameter than the unreinforced elastic end, over which flange the elastic end of the hose is drawn to form a gasket.

5. As a new article of manufacture, a flexible hose composed of elastic material and reinforced with canvas with the exception of an end thereof, in combination with a ferrule having a flange of larger diameter than the unreinforced elastic end, over which flange said elastic end of the hose is drawn to form a gasket, the reinforced portion of the hose extending as far as the side of the ferrule.

6. As a new article of manufacture, a flexible hose composed of elastic material and reinforced with canvas with the exception of an end thereof, in combination with a ferrule having a flange of larger diameter than the unreinforced elastic end, over which flange the elastic end of the hose is drawn to form a gasket, the reinforced portion of the hose extending to the base of the flange of the ferrule.

7. A flexible hose composed of elastic material having its intermediate portion reinforced with canvas and its ends of the elastic material, in combination with ferrules having flanges of larger diameter than the hose, over which flanges the unreinforced ends of the hose are drawn, said reinforced portion of the hose extending alongside the ferrules as far as their flanges.

ALFRED P. MILLER.

Witnesses:
S. E. HIBBEN,
LOUIS B. ERWIN.

---

Copies of this patent may be obtained for five cents each, by addressing the "Commissioner of Patents, Washington, D. C."